Feb. 11, 1941. B. E. SHAW 2,231,688
CONTROL FOR REFRIGERANT COMPRESSORS
Filed Aug. 29, 1938
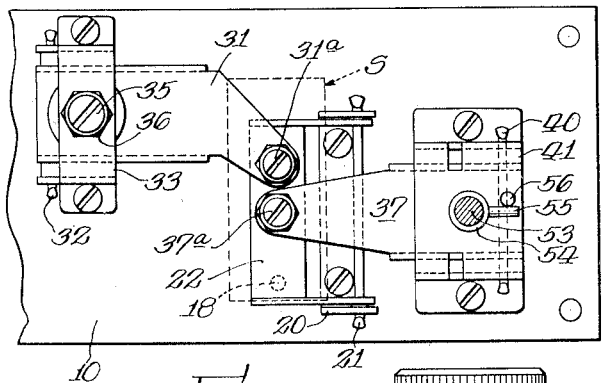
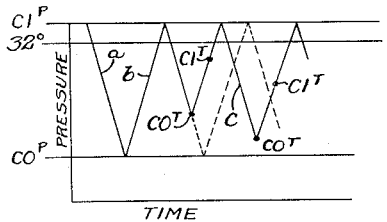
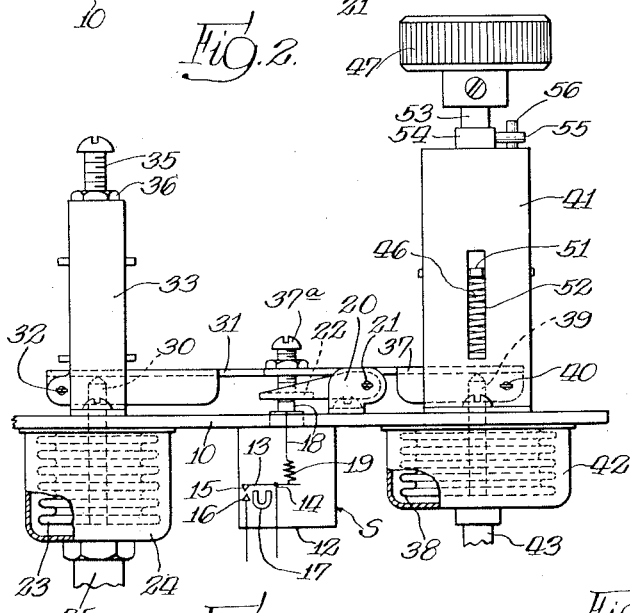
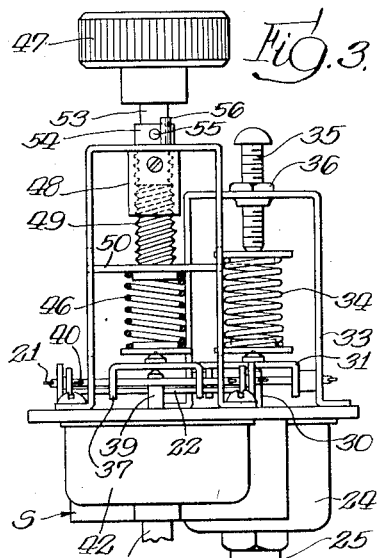
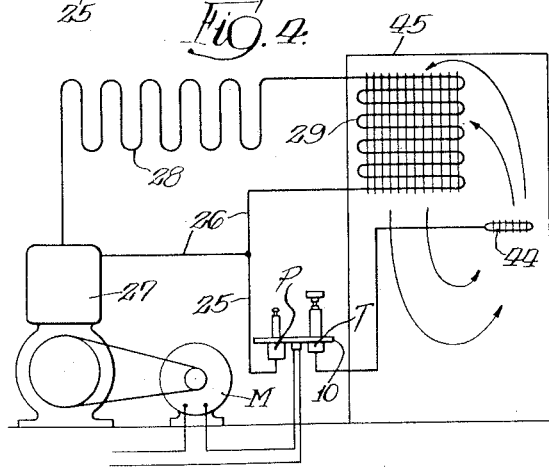
INVENTOR.
Burton E. Shaw,
BY Bair & Freeman
ATTORNEYS.

Patented Feb. 11, 1941

2,231,688

UNITED STATES PATENT OFFICE 2,231,688

CONTROL FOR REFRIGERANT COMPRESSORS

Burton E. Shaw, Bristol, Ind., assignor to Penn Electric Switch Co., Goshen, Ind., a corporation of Iowa Application August 29, 1938, Serial No. 227,312

7 Claims. (Cl. 62—4)

An object of my invention is to provide a controller for refrigerant compressors and the like which is comparatively simple and inexpensive to manufacture and which accomplishes certain control results desirable in connection with such a system.

More particularly it is my object to provide a switch structure in which a switch is movable to cut-out position by either a pressure actuated device or a temperature actuated device but is returnable to cut-in position only if both of the devices have returned to their respective cut-in positions.

A further object is to provide a switch having normal controlling means responsive to the low side pressure of the refrigerating system whereby to maintain a substantially constant pressure therein and to provide means to modify the action of the low side controller dependent upon air temperature in the space being refrigerated, manual means being provided for adjusting the temperature in the space as desired, and the normal control and the temperature control being so interlocked in a mechanical manner that only the cut out point of the switch is modified by the adjustable temperature responsive means and the cut-in point remains fixed in response to the normal control.

Still another object is to provide a single switch so controlled by a pair of condition responsive devices that the switch is responsive to either one of them independently for cut-out operation but is dependent upon both of them for cut-in operation whereby cut-in can occur only when both of the devices are in their cut-in positions.

With the foregoing and other objects in view, my invention comprises the elements and combinations thereof as well as features of construction and arrangement of parts which will be exemplified in the following description and the scope of the application of which will be indicated in the following claims.

In the accompanying drawing I illustrate one embodiment of my invention and with respect to the figures of the drawing, Figure 1 is a plan view of a panel with my control mounted thereon, an adjusting shaft of the structure being shown in section.

Figure 2 is a side elevation of Figure 1 showing a switch unit thereof diagrammatically.

Figure 3 is an end elevation of the right hand end of Figure 2.

Figure 4 is a diagrammatic view showing how my control switch is hooked into a refrigerating system.

Figure 5 is a graphic diagram illustrating the operation of the switch; and

Figures 6, 7, 8 and 9 are diagrammatic views showing the operation of the parts with respect to cut-in and cut-out positions of the switch.

On the drawing I have used the reference numeral 10 to indicate a base or panel on which the mechanism of my control switch is mounted. A switch unit S is provided consisting of a casing 12 in which there is mounted switch mechanism such as shown in my Patent No. 2,111,816, issued March 22, 1938. Diagrammatically the mechanism consists of an armature 13 pivoted at 14 and operable to normally close a contact 15 against a contact 16 due to the attraction of the armature by a permanent magnet 17. An actuating pin 18 extends slidably from the casing 12 and is connected by means of a spring 19 with the armature arm 13. The spring is merely interposed between the armature arm and the actuating pin.

A bracket 20 is mounted on the panel 10 and has a pair of ears supporting a pivot pin 21. A pressure plate 22 has a pair of arms pivoted on the pin 21 and is adapted to engage the actuating pin 18 and depress it to cut-out position indicated as CO in Figure 6 or permit it to return to cut-in position indicated at CI depending upon the position of the pressure plate.

A normal control for the pressure plate 22 is provided in the form of a bellows 23 enclosed in a bellows casing 24. A pressure connection 25 extends to the low side conduit 26 of a refrigerating system shown diagrammatically in Figure 4. The system further includes a refrigerant compressor 27, a condenser 28 and an evaporator 29. A motor M when energized operates the compressor 27.

The bellows 23 has an actuating pin 30 extending upwardly to engage an arm 31. The arm 31 is pivoted at 32 to a bracket 33. The pressure against the bellows is opposed by a spring 34 which has an adjustment screw 35 to change the range of operation of the bellows 23. The screw 35 is threaded in the bracket 33 which as shown in Figure 3 is yoke shaped. A lock nut 36 is provided to retain the adjustment after it is made.

A second arm 37 is responsive to a bellows 38 having a pin 39 extending therefrom and engaging the arm. The arm 37 is pivoted at 40 to a bracket 41. The bellows 38 is enclosed in a housing 42 having a conduit 43 extending therefrom and terminating in a finned bulb 44. The bulb 44 is responsive to the air temperature in a box 45 or other space to be refrigerated by operation of the evaporator 29. Opposing the bellows 38 is a spring 46. The tension of the spring 46 may be adjusted by a knob 47. The knob is connected with a screw threaded sleeve 48 threaded on a rod 49. The rod 49 is secured to a plate 50 which has fingers 51 extending into slots 52 of the bracket 41 to prevent rotation but permit sliding movement of the rod 49.

The sleeve 48 is rotatable and nonslidable relative to the bracket 41 as shown in Figure 3. An operative connection is provided between the knob 47 and the sleeve 48 consisting of a shaft 53. A collar 54 on the shaft has a stop pin 55 extending therefrom adaptable to engage a stop pin 56 of the bracket 41 to limit rotation of the knob 47 to one revolution. A suitable dial may be provided for the knob 47 in the usual manner, but since this is common practice I have not illustrated such dial on the drawing.

*Practical operation*

In refrigerating systems where the refrigerant compressor motor is normally controlled in response to the low-side pressure in the system, it is sometimes desirable to maintain certain absolute air temperatures in the space being refrigerated. It is also desirable in some installations that the space temperature be under control of the user of the box. This is particularly true of butcher box installations where it is desirable, especially to conform to varying outside temperature conditions, to vary the box temperature for most efficient operation of the evaporator 29 throughout different seasons of the year. It is undesirable however to have the refrigerating system so under the control of the air temperature that the cut-in periods are hastened to such an extent that the evaporator is not given time to go to a temperature of 32° Fahrenheit in order to melt any accumulation of frost thereon each cycle of operation.

I have therefore provided a type of control in which the normal responsive device and the air temperature responsive device are so interlocked mechanically that the cut-out of the switch in response to temperature can be varied as desired but the cut-in point in response to the normal control will not be varied.

Referring to Figure 5, the cut-in point in response to pressure is indicated as a line $CI^P$. The cut-out point in response to pressure is indicated by the line $CO^P$. $CI^P$ it will be noted is above the line 32° which line indicates the equivalent low side pressure of the refrigerating system for a temperature of 32° of the evaporator. Lines $a$ and $b$ indicate pressure drop and pressure rise after cut-in in response to pressure and cut-out in response to pressure respectively have occurred. This is the normal operation without the temperature responsive bellows 38 in action.

The distance between $CI^P$ and $CO^P$ would, in my control, be necessarily of considerable range and the temperature responsive bellows 38 would have a range of action falling within the range of action of the pressure responsive bellows 23. Dotted lines in this figure indicate continued normal operation similar to the lines $a$ and $b$. With the temperature responsive bellows 38 adjusted to a certain point however it will cause cut-out at point $CO^T$ before the pressure affecting the bellows 23 got up to $CI^P$ again. Due to the particular interlocking relation which will hereinafter be more fully described, the motor M remains energized until the pressure reaches the $CI^P$ line again whereupon the pressure will go down as indicated by the line $c$.

If the temperature responsive bellows 38 is then set manually for operation at a lower range, the next cut-out point in response to temperature would be lower and likewise the succeeding cut-in point in response to temperature would be lower. However the pressure will go on up to the line $CI^P$ and it is evident from this graphic diagram that only the cut-out point in response to temperature is affected by the manually adjustable temperature responsive bellows 38.

To explain the interlocked relation, Figures 6, 7, 8 and 9 show the operation diagrammatically. To simplify the diagrammatic showing and description of the operation, the levers 31 and 37 have been pivoted at a single point, taking the place of both pivots 32 and 40, and the pressure and temperature bellows P and T have been placed on the opposite side of the pivot from the point of engagement of the levers 31 and 37 with the actuating element 22 instead of between the pivot and the actuating element, due to the reversal of the showing of the elements P and T.

Beginning with Figure 6 the switch is in cut-in position. In response to energization of the motor M, the pressure in the line 26 and consequently on the pressure bellows 23 (P) will go down and the temperature surrounding the bulb 44 and consequently on the temperature bellows 38 (T) will go down. Referring to Figure 7 the pressure has receded to a point between cut-in and cut-out positions and the temperature surrounding the bulb 44 has also receded to approximately the same position. If the box 45 remains closed the temperature of T may reduce faster than the pressure in the line 26. Therefore the reduction in temperature will be the controlling factor because T causes the arm 37 to move the plate 22 away from the arm 31 as shown in Figure 8. Thus the switch cuts out in response to temperature.

As the pressure goes up again, cut-in of the switch by T will occur only if pressure in the line 26 has increased sufficiently to permit it to do so. In Figure 9 the pressure has not gone up sufficiently to permit the switch to return to cut-in position and accordingly the cut-in position will be in response to the pressure controller when it finally moves to the position shown in Figure 6, even though the temperature controller has already moved to its equivalent cut-in position.

With the arrangement shown it is further evident that the cut-in and cut-out positions, being spaced because of the differential of operation of the switch, enter into the mechanical interlocked operation whereby either the temperature or pressure control can cause the switch to cut-out, but it takes both of them to permit it to cut-in. With this arrangement I am able to provide for manual control of the cut-out temperature in the box without any possibility of the cut-in temperature being so affected that it does not carry the evaporator temperature above the frost line each cycle of operation.

In view of the foregoing it is obvious that the several objects of the invention are achieved and other advantageous results obtained. As many changes can be made in carrying out the disclosed construction without departing from the scope of the invention, it is intended that all matter contained in the above description or shown in the accompanying drawing shall be interpreted as illustrative only and not in a limiting sense.

I claim as my invention:

1. In a control for refrigerating systems, a switch, an actuating element therefor having cut-in and cut-out points substantially spaced from each other due to the differential of operation of the switch, pressure responsive means connected with a refrigerant conduit of the refrigerating system and cooperating with said switch to move it to cut-out and cut-in positions depending upon pressure conditions in the refrigerating system, and temperature responsive means responsive to the temperature in the space being refrigerated and directly cooperating with said switch to move it to cut-out position independent of said pressure responsive means, the switch being movable back to cut-in position only after both the pressure-responsive means and the temperature responsive means have returned to their cut-in positions.

2. In a control for refrigerant compressor motors, a control device in the circuit of the motor, an actuating element for said control device having cut-in and cut-out points spaced from each other due to the differential of operation of the control device, pressure responsive means connected with a low-side refrigerant conduit of the refrigerant compressor and directly cooperating with said control device to move it to cut-out and cut-in positions depending upon pressure conditions in said conduit and temperature responsive means responsive to the temperature in the space being refrigerated and directly cooperating with said control device to move it to cut-out and cut-in positions, said pressure responsive means or said temperature responsive means being operable to move said control device to cut-out position independent of each other and to move it back to cut-in position only upon both responsive means returning to their respective cut-in positions, movement of said control device to cut-out position being in response to that responsive means which reaches its cut-out position first.

3. In a control device for refrigerant compressors, an actuating element therefor having cut-in and cut-out points spaced substantially from each other due to the differential of operation of the control device, pressure responsive means connected with the low pressure conduit of the refrigerant compressor and cooperating with said actuating element to move said control device to cut-out and cut-in positions, and temperature responsive means responsive to the temperature in the space being refrigerated and cooperating with said actuating element to move said control device to cut-out positions independent of said pressure responsive means and to move the actuating element back to cut-in position of the control device only after the pressure responsive means has returned to cut-in position, such movement of aid control device being thereby in response to that responsive means which first assumes its cut-out position.

4. In a control device of the kind disclosed, a switch electrically connected with a motor of a refrigerant compressor, means to normally close said switch, an actuating element for opening said switch, said actuating element having cut-in and cut-out points spaced from each other due to the differential of operation of the switch, a pressure responsive means responsive to pressure conditions in the refrigerating system and operable upon movement to a predetermined position to engage said actuating element and move it to the cut-out position of the switch and temperature responsive means responsive to the temperature in the space being refrigerated and operable upon movement to a predetermined position to engage said actuating element and move it to cut-out position of the switch in response to progressive movement of said temperature responsive means, such movement being independent of the position of the pressure responsive means whereby both the pressure and the temperature responsive means must return to cut-in position before said switch can return to its cut-in position after either of them has moved the switch to cut-out position.

5. In a control device of the kind disclosed, a switch electrically connected with a motor of a refrigerant compressor, a permanent magnet and an armature cooperating therewith to normally close said switch, an actuating element for opening said switch against the bias of the magnet, said actuating element having its cut-out point spaced from its cut-in point due to the action of said magnet tending to hold said armature in cut-in position, pressure responsive means responsive to pressure conditions in the refrigerating system and operable upon movement to a predetermined position to directly engage said actuating element and move it to the cut-out position of the switch and temperature responsive means responsive to the temperature in the space being refrigerated and operable upon movement to a predetermined position to directly engage said actuating element and move it to cut-out position of the switch, either of said responsive means being operable independent of the other.

6. In a control device for a refrigerating system, a switch, a first means responsive to pressure in the system and a second means responsive to the temperature of the space being refrigerated, said first and second means cooperating with said switch to operate the same and the cooperation being such as to cause the switch to assume cut-out position in direct response to and movement of either the first or second means whichever first assumes cut-out position, and to cause said switch to assume cut-in position only when both of said means are in their cut-in positions.

7. In a control device for a refrigerating system, a switch, a first means responsive to pressure in the low side conduit of the system and a second means responsive to the temperature of the space being refrigerated, said first and second means each cooperating with said switch to cause it to assume cut-out position in response to either the first or second means, whichever first assumes cut-out position, and to cause said switch to assume cut-in position only after both of said responsive means have returned to their respective cut-in positions.

BURTON E. SHAW.